United States Patent [19]

Berkcan

[11] Patent Number: 5,401,959
[45] Date of Patent: Mar. 28, 1995

[54] OPTICAL TEMPERATURE COMPENSATION OF SPECTRAL MODULATION SENSORS BY RATIOMETRIC INTERROGATION HAVING DICHROIC FILTERS

[75] Inventor: Ertugrul Berkcan, Niskayuna, N.Y.

[73] Assignee: General Electric Company, Schenectady, N.Y.

[21] Appl. No.: 118,467

[22] Filed: Sep. 8, 1993

[51] Int. Cl.$^6$ .............................................. H01J 5/16
[52] U.S. Cl. ................... 250/227.23; 250/226
[58] Field of Search ............... 280/227.23, 227.21, 280/227.14, 227.18, 226; 356/345, 350, 352; 73/802, 804–806

[56] References Cited

U.S. PATENT DOCUMENTS

| | | | |
|---|---|---|---|
| 4,945,230 | 7/1990 | Saaski et al. | 250/227.21 |
| 5,001,338 | 3/1991 | Boero | 250/227.23 |
| 5,191,208 | 3/1993 | Slemon et al. | 250/227.23 |

OTHER PUBLICATIONS

"A Fiber Optic Sensing System Based on Spectral Modulation", by E. W. Saaski, et al, Advances in Instrumentation, vol. 41, Part 3, pp. 1177–1184, Instrument Society of America, Jul. 1986.

"Multimode Fiber Optic Pressure Sensor With Extended Range", by E. W. Saaski, et al, SPIE vol. 838, Fiber Optic and Laser Sensors V, pp. 46–48, Jan. 1987.

"Fiber Optic Temperature Sensor Using Spectral Modulation", by J. C. Hartl, et al, SPIE, Vo. 838 Fiber Optic and Laser Sensors V, pp. 257–261, Jan. 1987.

"Spectrum-Modulating Fiber-Optic Sensors for Aircraft Control Systems", by Glen Beheim, et al, 1st International Military and Government Fiber-Optic and Communications Exposition, Washington, D.C., Mar. 1987, pp. 1–8.

"Silicon-Etalon Fiber-Optic Temperature Sensor", Glen Beheim, et al, SPIE vol. 1169 Fiber and Optic Laser Sensors VII, pp. 504–511, Jan. 1989.

"Differential Absorption Sensors: The Elimination of LED Temperature and Ageing Effects", by E. Theocharous, SPIE. vol. 798 Fiber Optic Sensors II, pp. 253–256, Jan. 1987.

"A New Cad Technique for (Narrow Band) Inhomogeneous Thin Film Filters", by E. Berkcan, et al., SPIE vol. 518 Optical Systems Engineering IV, pp. 98–104, Jan. 1984.

*Primary Examiner*—David C. Nelms
*Assistant Examiner*—Que T. Le
*Attorney, Agent, or Firm*—Ann M. Kratz; Marvin Snyder

[57] ABSTRACT

An optical temperature compensation system for spectral modulation sensors comprises a light director for receiving excitation light and a spectral modulation sensor for receiving a first portion of the excitation light from the light director. A source monitoring component is positioned for receiving a second portion of the excitation light from the light director. The source monitoring component includes offset optics optically coupled to the light director, a source dichroic filter for splitting the light from the offset optics, a first source photodetector for receiving wavelengths above the effective cutoff wavelength of the source dichroic filter, and a second source photodetector for receiving wavelengths below the effective cutoff wavelength of the source dichroic filter. A detection monitoring component is positioned for receiving modulated light from the spectral modulation sensor and comprises a detection dichroic filter for splitting light from the spectral modulation sensor, a first detection photodetector for receiving wavelengths above the effective cutoff wavelength of the detection dichroic filter, and a second detection photodetector for receiving wavelengths below the effective cutoff wavelength of the detection dichroic filter.

16 Claims, 13 Drawing Sheets

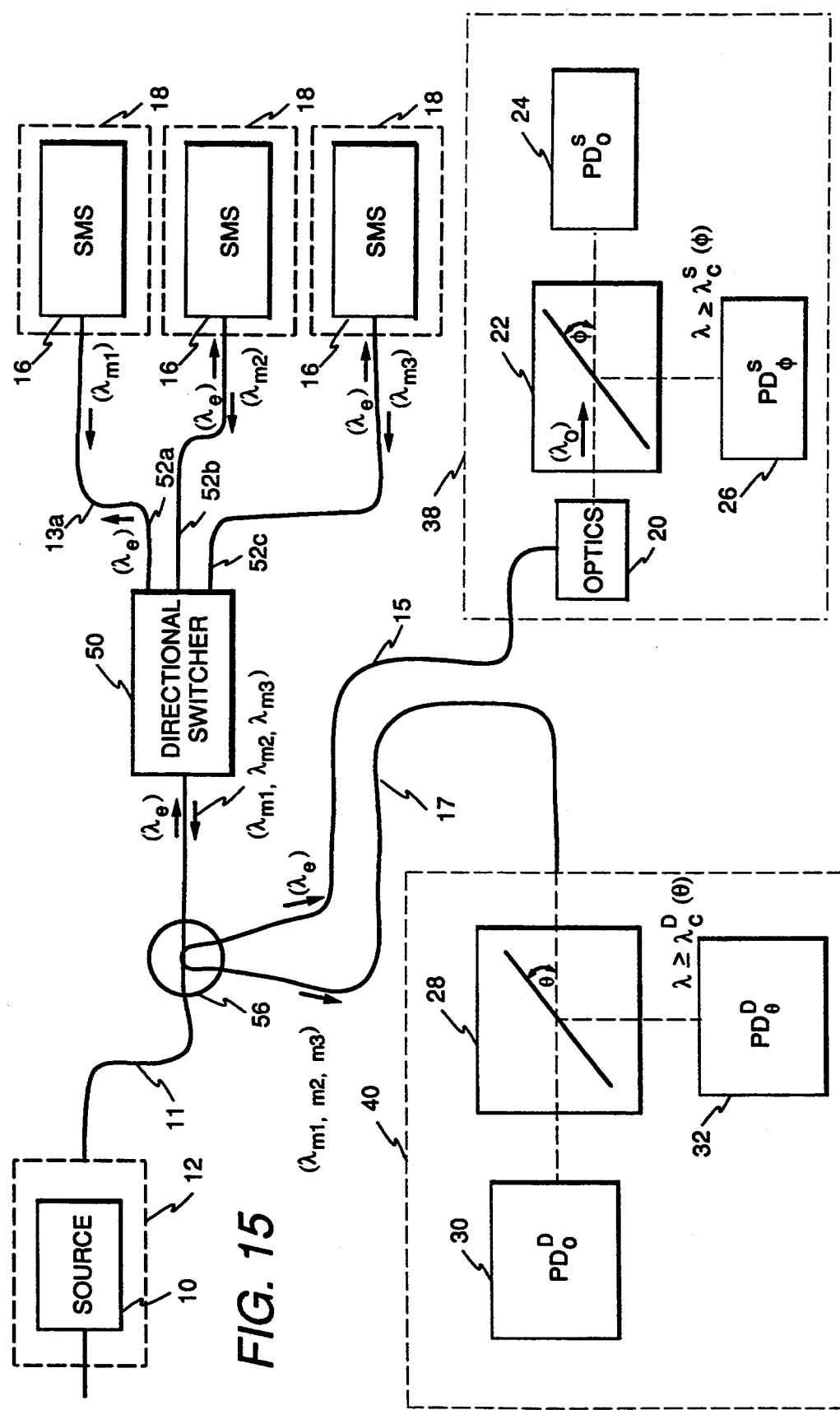

OPTICAL TEMPERATURE COMPENSATION OF SPECTRAL MODULATION SENSORS BY RATIOMETRIC INTERROGATION HAVING DICHROIC FILTERS

CROSS-REFERENCE TO RELATED APPLICATION

This application is related to the following co-pending application which is commonly assigned and is incorporated herein by reference: Berkcan, "Optical Temperature Compensation of Spectral Modulation Sensors by Spectrographic Interrogation", Ser. No. 08/118,361, (attorney's docket number RD-23,110), filed concurrently herewith.

BACKGROUND OF THE INVENTION

1. Field of the Invention

This invention relates generally to optical temperature compensation of spectral modulation sensors, and, more particularly, to ratiometric interrogation of spectral modulation sensors.

2. Description of the Related Art

In advanced aircraft applications, the use of fiber optic sensors to carry information between sensors and control modules provides immunity from contamination by electromagnetic sources, reduces volume and weight by eliminating the need for electromagnetic shielding, and further reduces weight by replacing metal conductors with low weight optical fibers. Advantages afforded by spectral modulation based fiber optic sensors include polarization independence, ease of multiplexing sensors with a common electro-optical interface, and reduced sensitivity to variations of link losses.

The sensitivity of these sensors to source temperature, however, severely limits their usefulness for aircraft engine or airframe applications. Typically, light emitting diodes (LEDs) are used for interrogating the sensors. The source temperature drift is critical in view of the high temperatures and acute temperature changes that occur in aircraft engines. The process of using thermo-electric coolers for controlling the source temperature is slow and breaks down at high temperatures due to the diffusion of carriers and electro-migration in the thermo-electric element.

To avoid measurement inaccuracies resulting from changes in the light source intensity and changes in light transmission intensity due to bending of the optical fibers or optical connector loss, Saaski et al., U.S. Pat. No. 4,945,230, issued Jul. 31, 1990, describes a technique using ratiometric measurement with spectral modulation sensors (SMS). In the Saaski device the physical parameter being measured causes changes in the reflectivity and transmission of the sensor's optically resonant structure and thus spectrally modulates the output light from the sensor as a function of the physical parameter being measured. The spectrally modulated output light is converted into an output electrical signal by detection means. In one embodiment the detection means splits the spectrally modulated light into two spectral components, each of which is separately converted into an electrical signal by a photodetector means. A divider circuit then takes the ratio of these two electrical signals to provide an output signal. The Saaski device does not avoid inaccuracies due to source temperature.

SUMMARY OF THE INVENTION

Accordingly, one object of the present invention is to increase the source temperature robustness and decrease the temperature coefficient of sensitivity for a spectral modulation sensor.

Briefly, in accordance with a preferred embodiment of the invention, an optical temperature compensation system for spectral modulation sensors comprises a light director for receiving excitation light and a spectral modulation sensor for receiving a first portion of the excitation light from the light director. A source monitoring component is positioned for receiving a second portion of the excitation light from the light director. The source monitoring component comprises offset optics coupled to the light director, a source dichroic filter for splitting the light from the offset optics, a first source photodetector for receiving wavelengths above the effective cutoff wavelength of the source dichroic filter, and a second source photodetector for receiving wavelengths below the effective cutoff wavelength of the source dichroic filter. A detection monitoring component positioned for receiving modulated light from the spectral modulation sensor comprises a detection dichroic filter for splitting light from the spectral modulation sensor, a first detection photodetector for receiving wavelengths above the effective cutoff wavelength of the detection dichroic filter, and a second detection photodetector for receiving wavelengths below the effective cutoff wavelength of the detection dichroic filter.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 15 is a schematic diagram of still another embodiment of the invention employing multiplexed spectral modulation sensors.

DETAILED DESCRIPTION OF PREFERRED EMBODIMENTS OF THE INVENTION

Figure 1:
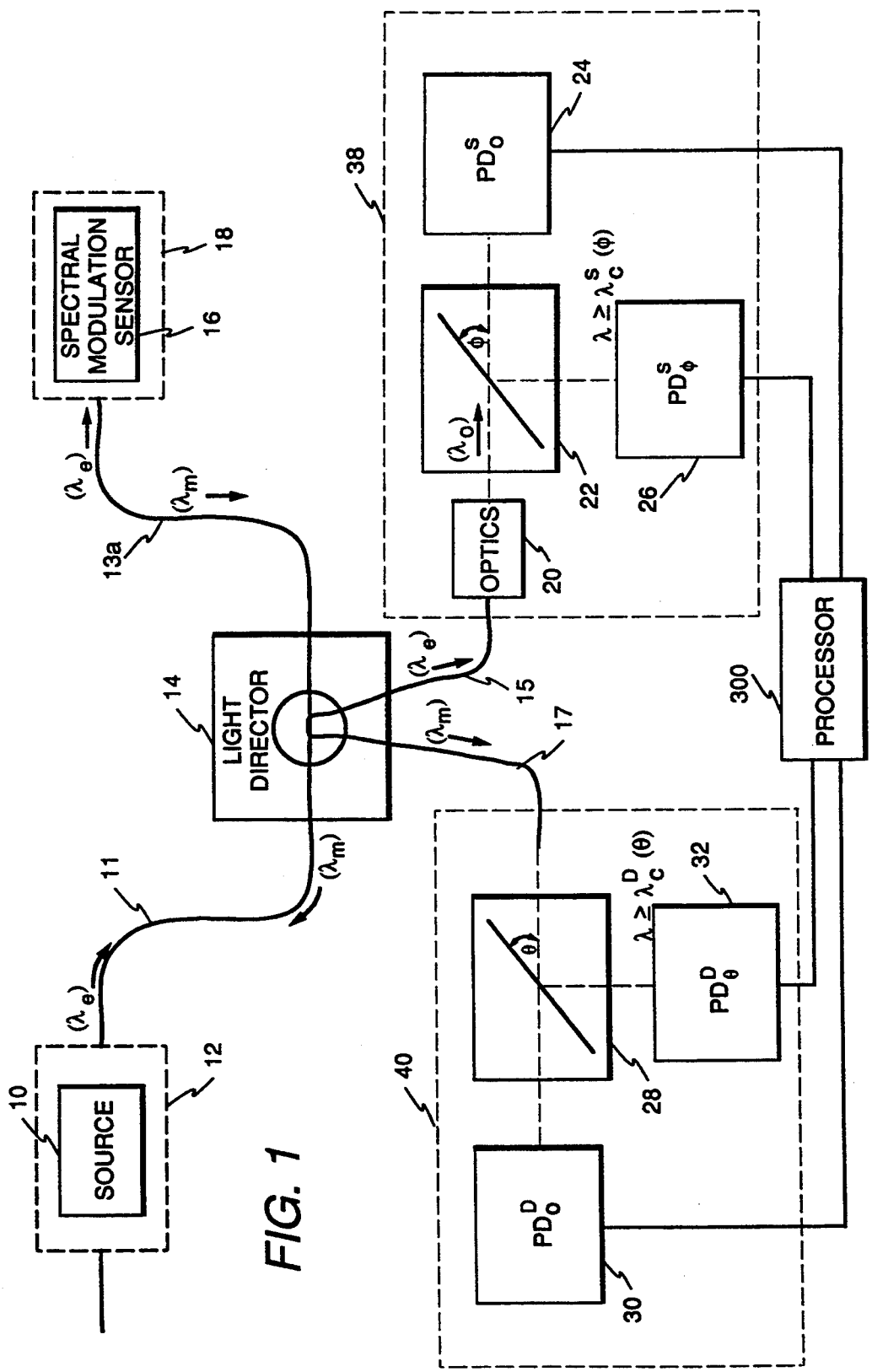
FIG. 1 is a schematic diagram of one embodiment of the invention employing a reflective spectral modulation sensor.

FIG. 1 is a schematic diagram of one embodiment of the invention in which a reflective sensor is used. A light source 10 is typically a light emitting diode (LED). Light source 10 may be surrounded by a thermo-electric cooler or temperature controller 12, such as supplied by Melles Griot, Inc., of Irvine, Calif. Throughout the drawings, solid lines are intended to represent fibers or electrical wires whereas dashed lines are intended to represent light which has emerged from a fiber or other optical component. Micro-optics and fiber optic manipulators, which are typically used for purposes such as coupling the light from the source into an optical fiber 11 or directing light from a fiber into another fiber or optical component, are not shown in the drawings. Micro-optics and fiber optic manipulators, as well as temperature controllers, can be used for characterizing the system.

The light ($\lambda_e$) from source 10 travels through fiber 11 to a light director 14 which can comprise a directional coupler, such as supplied by Canstar, a division of Canada Wire and Cable Ltd. in Westboro, Mass. Light director 14 splits the excitation light from source 10 into two portions.

One of the two portions of excitation light enters a spectral modulation fiber optic sensor (SMS) 16 through an optical fiber 13a. The sensor, which can be a reflective SMS such as supplied by Metricor, Inc., of Woodinville, Wash., can be designed to detect any one of a number of parameters including temperature, pressure, position, flow, speed, vibration, and acceleration. The light ($\lambda_m$) modulated by this sensor is coupled back into light director 14 along fiber 13a. Sensor 16 may be surrounded by a thermo-electric cooler 18 to allow accurate calibration of the sensor.

The other of the two portions of excitation light emanating from light director 14 enters a source monitoring component 38 through a fiber 15. Initially the light passes through offset optics 20, which spectrally modify the excitation light and provide the capability of directionally modifying the optical axes of the fiber and the filter.

Figure 2:
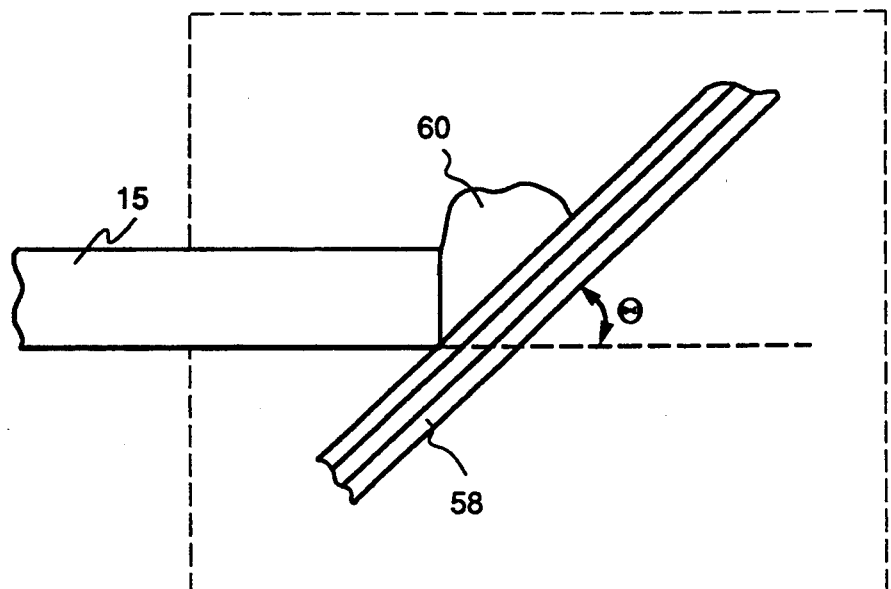
FIG. 2 is a schematic diagram of offset optics usable in the invention.
Figure 3:
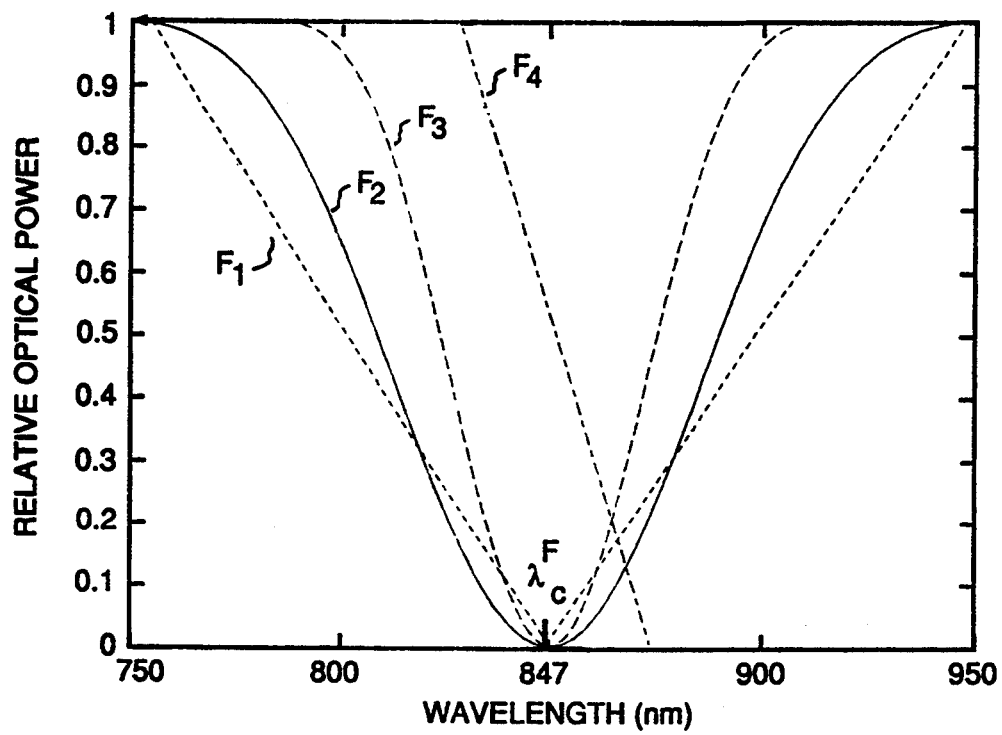
FIG. 3 is a graph illustrating several filter functions usable in the invention.

Offset optics 20 typically comprise transmissive filter components with designed spectral characteristics. One example of the offset optics is illustrated in FIG. 2. Fiber 15 is directed towards a multi-layer, thin film interference filter 58 situated at an angle $\Theta$. A multi-layer interference filter may be obtained from vendors such as Melles Griot, Inc. or a filter may be constructed with Fabry-Perot etalons. Other types of usable filters are described in E. Berkcan & G. H. Cohen, "A new CAD technique for (narrow band) inhomogeneous thin film filters," SPIE Vol. 518, Optical Systems Engineering IV, 98-104 (1984); and "Interference Filters," Melles Griot Inc. Optics Guide 5, pp. 11-25 through 11-30 (1990). Several sample filter functions are shown in the graph of FIG. 3.

The angle $\Theta$ of filter 58 in the embodiment of FIG. 2 is adjusted to provide minimal back reflections while preserving the spectral characteristics of the filter. A preferred range of $\Theta$ is 85°–89° C. Additionally, an index-matching gel 60 (having an index of refraction matching that of the fiber) can be used between fiber 15 and filter 58 to further remove back reflections.

Figure 4:
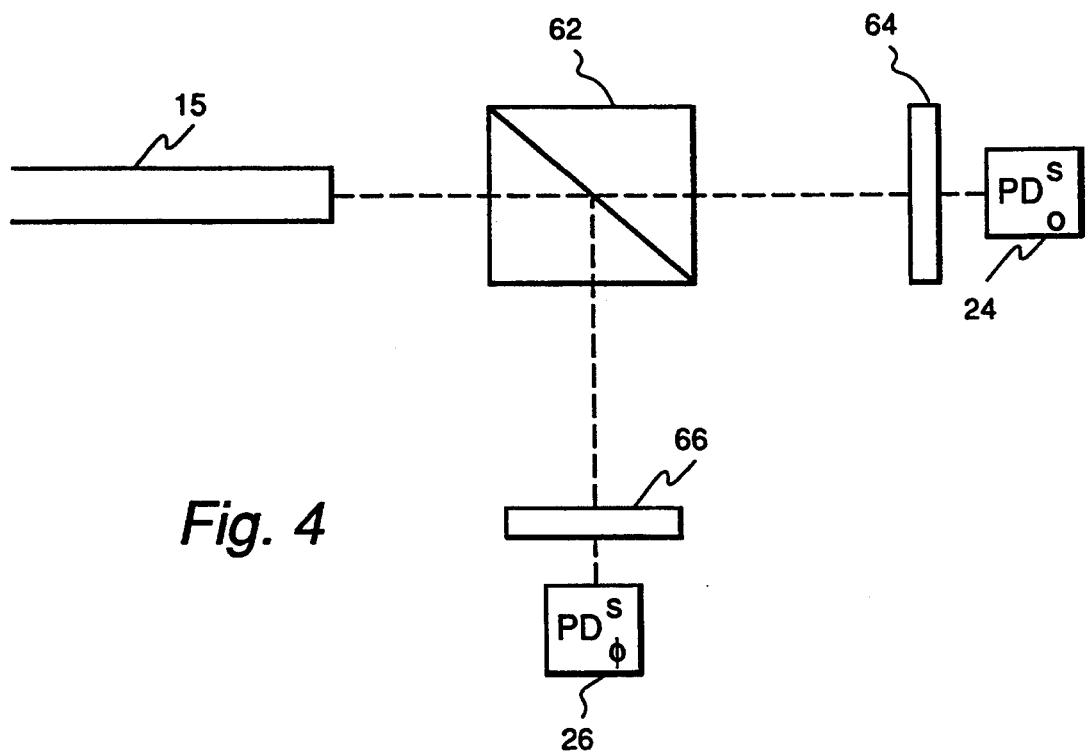
FIG. 4 is a schematic diagram of a dichroic filter usable in the invention.

Offset light ($\lambda_o$) from offset optics 20, as shown in the embodiment of FIG. 1, approaches a source dichroic filter 22 having an angle $\phi$ and a cutoff wavelength $\lambda^s_c$. The term "dichroic filter" is meant to include any structure which splits a beam of light into two portions, with one portion being light of wavelengths above a certain cutoff wavelength and with the other portion being light of wavelengths below the cutoff wavelength. One example of such a filter is a commercially available dichroic filter, stock number 10 QM20HS, manufactured by Newport Corp. of Irvine, Calif. In an alternative embodiment, shown in FIG. 4, the dichroic filter comprises a simple beam splitter 62, a low pass filter 64, and a high pass filter 66. The beam splitter directs one portion of the excitation light to the high pass filter and another portion of the light to the low pass filter.

Two source photodetectors 24 and 26 are present. One source photodetector $PD^s_\phi$ 26 monitors the power $PD(\lambda \geq \lambda^s_c(\phi))$. The other source photodetector $PD^s_0$ 24 monitors the power $PD(\lambda < \lambda^s_c(\phi))$. These photodetectors may comprise silicon PIN photodiodes such as manufactured by EG&G Judson of Montgomeryville, Pa., for example.

As shown in FIG. 1, the light ($\lambda_m$) modulated by SMS 16 passes along fiber 13a back through light director 14, and one portion is carried towards source 10 along fiber 11 while another portion is carried towards a detection monitoring component 40 along an optical fiber 17. The detection monitoring component is similar to the source monitoring component in that it includes a dichroic filter 28 having an angle $\theta$ and a cutoff wavelength $\lambda^d_c$ and two photodetectors, $PD^d_0$ 30 for monitoring the power $PD(\lambda < \lambda^d_c(\theta))$ and $PD^d_\theta$ 32 for monitoring the power $PD(\lambda \geq \lambda^d_c(\theta))$.

The output signals of the photodetectors can be sent to processor 300 and used to determine the value of the parameter being measured. A calibration curve (not shown) can be graphed by plotting a graph of a detected ratio $\rho$ versus the parameter to be measured, where, in one embodiment, $\rho$ is defined by the equation:

$$\rho = (PD^d_0 / PD^d_\theta)(PD^s_\phi / PD^s_0).$$

Data points on the calibration curve are obtained by supplying known values of the parameter to be measured or physical properties and measuring respective $\rho$ for each such parameter or physical property. After sufficient data points are obtained, a curve can be interpolated. After the curve is graphed, an unknown parameter can be determined by measuring $\rho$ and finding the corresponding parameter value as indicated on the calibration curve.

Because the losses in the sensor and the detection monitoring component are typically more significantly larger than the losses in the source monitoring component, the design and implementation of the offset optics is not critical.

Figure 5:
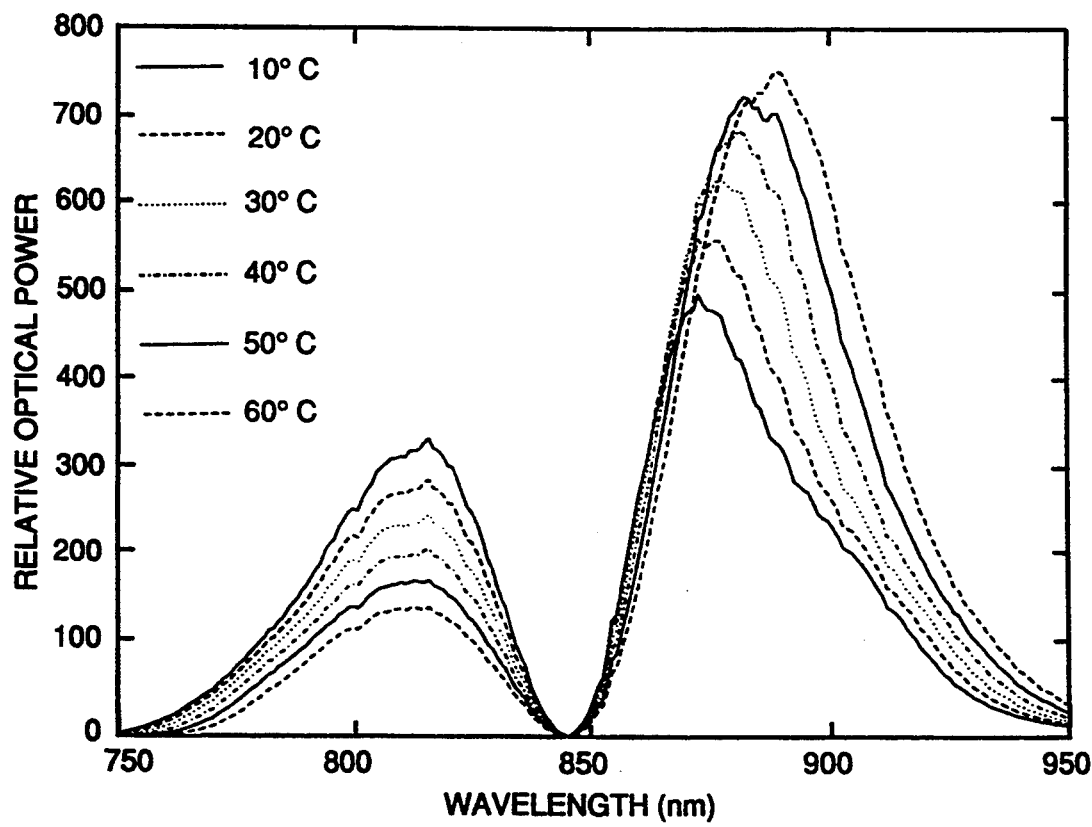
FIG. 5 is a graph illustrating a spectral modulation sensor response versus wavelength curve.

Several experiments and simulations were performed using the above-described invention. Each of sensors 16 used was a commercially available reflective spectral modulation fiber optic temperature and pressure sensor. An LED supplied by Honeywell, Inc., of Richardson, Tex., was used as light source 10. The output spectrum of the LED shifted towards longer wavelengths as the temperature of the source was increased. The temperature of the source was varied in the range of 10° C. to 60° C. in 10° C. increments. The average value for the shift of the center of the full width at half the maximum of the spectral distribution was 0.32 nm/°C., and the total power emitted decreased by as much as 0.3%/°C. FIG. 5 illustrates a sensor response versus wavelength curve for each of the source temperatures employed, while the simulations of FIGS. 6–11 illustrate various other parameters determined for each of those temperatures, measured over a range of sensor temperatures, as described below.

Figure 6:
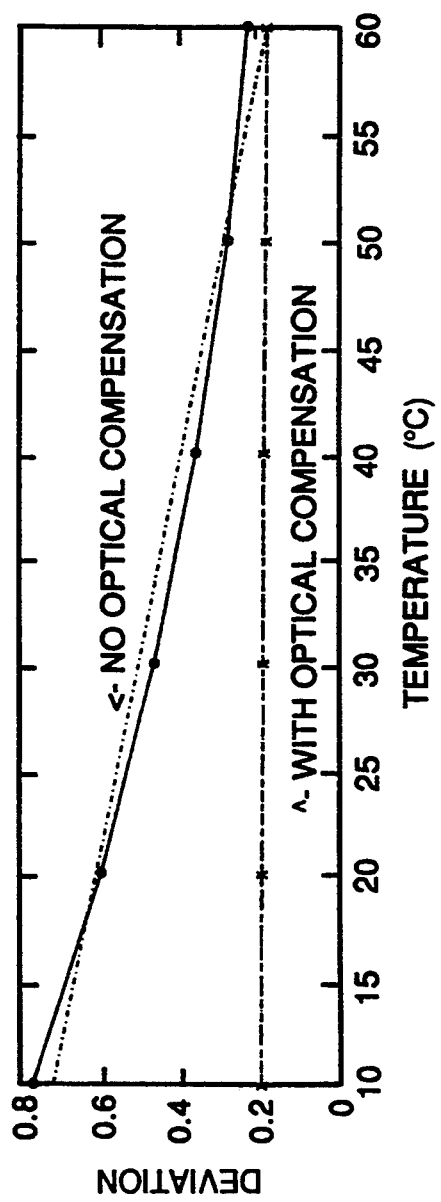
FIG. 6 is a graphical comparison of the deviation of an optically compensated optical detection system with an optically uncompensated system.

FIG. 6 illustrates the simulated deviation (change in detected ratio ρ) of an optically compensated detection system (o) in comparison with the deviation of an uncompensated system (x). The term "uncompensated system" refers to the situation in which the source monitoring component does not employ offset optics or a dichroic filter separate and different from the detection monitoring component.

Figure 7:
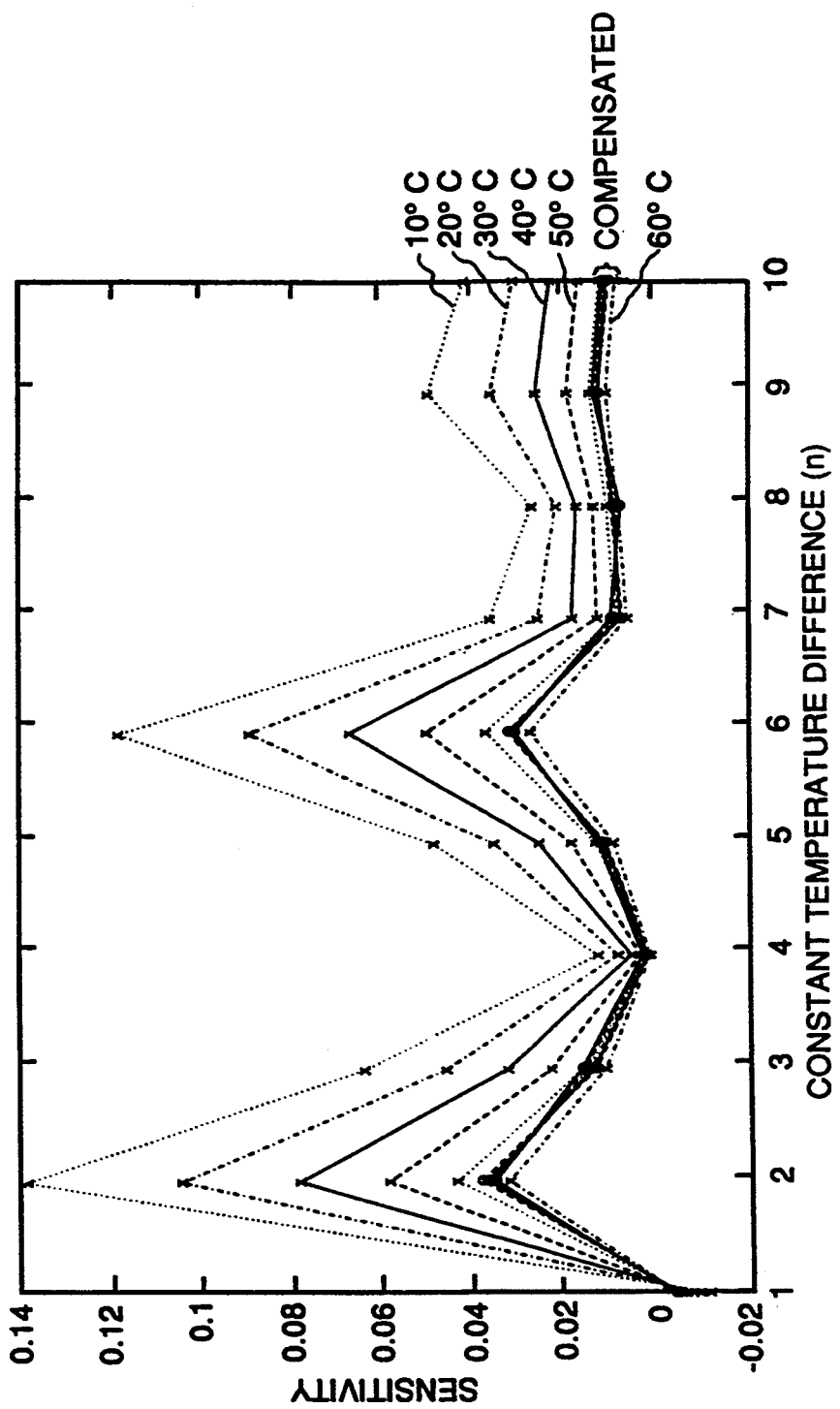
FIG. 7 is a graphical comparison of the sensitivity of an optically compensated optical detection system with an optically uncompensated system.

FIG. 7 illustrates the simulated sensitivity of an optically compensated detection system (o) in comparison with the sensitivity of an uncompensated system (x) at constant sensor temperature differences of 5° C. between 10° C. and 60° C., represented by the equation $$T_n = nT_d + T_o,$$

wherein n represents a whole number from 1 to 10, $T_n$ represents the upper temperature for a given value of n, $T_{n-1}$ would represent the lower temperature for a given value of n, $T_o$ represents the initial value of $T_n$ (10° C.), and $T_d$ (which equals $T_n - T_{n-1}$) represents the constant incremental difference in temperature of 5° C. Sensitivity is defined as the slope of a ρ versus source temperature curve (not shown). In FIGS. 7–11, the source temperatures for compensated detection systems range from 10° C. to 60° C. in 10° C. increments just as the temperatures in the uncompensated systems do; for simplicity the compensated curves are collectively labeled as "compensated" rather than provided with individual designations.

Figure 8:
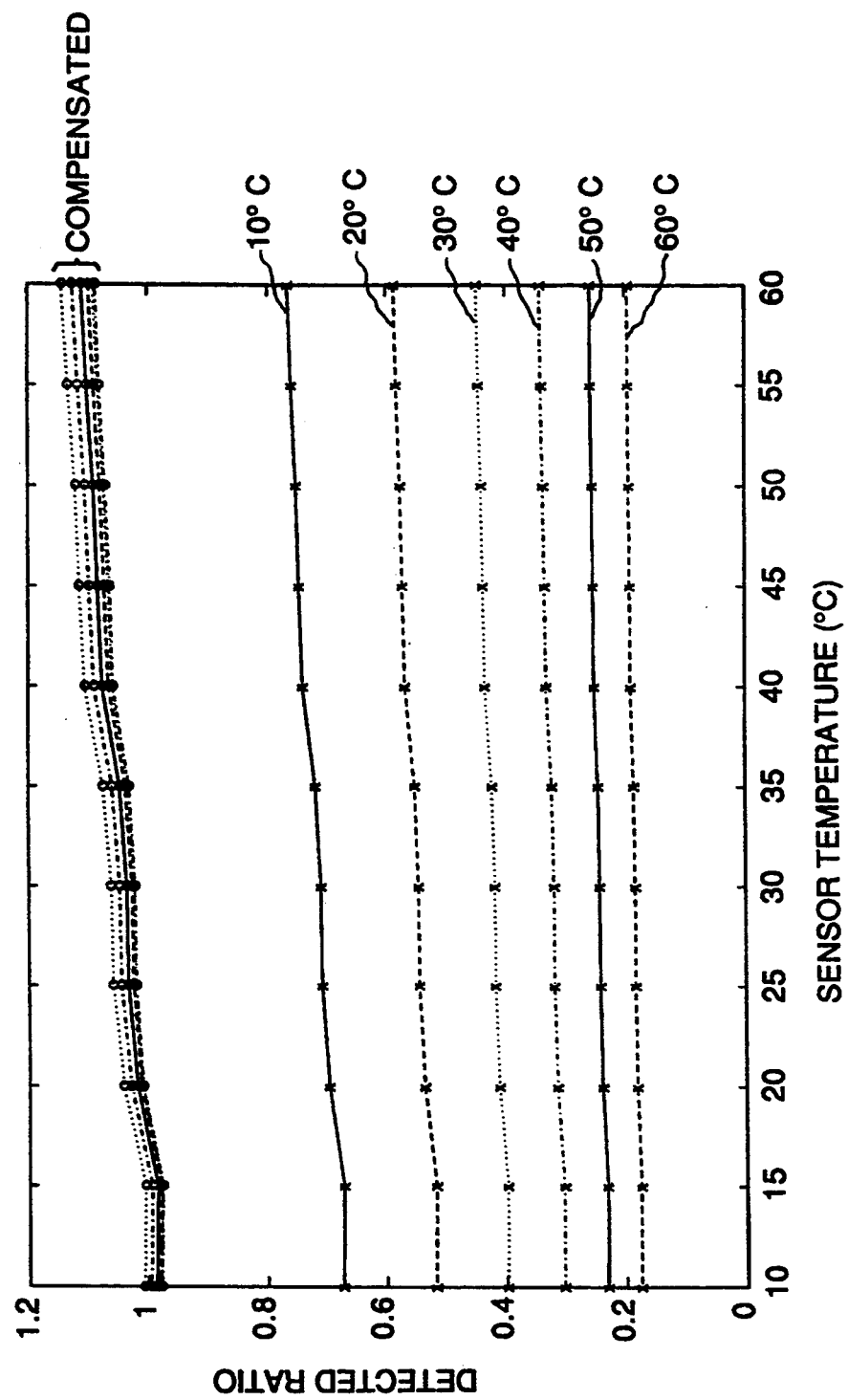
FIG. 8 is a graphical comparison of the detected ratio of an optically compensated optical detection system with an optically uncompensated system.

FIG. 8 illustrates the simulated detected ratio of an optically compensated detection system (o) in comparison with that of an uncompensated system (x) measured over a range of sensor temperatures. In FIG. 8, $\lambda^d_c(\theta)$ and $\lambda^s_c(\phi) = 845$ nm and the filter type is F3 (shown in the graph of FIG. 3).

Figure 9:
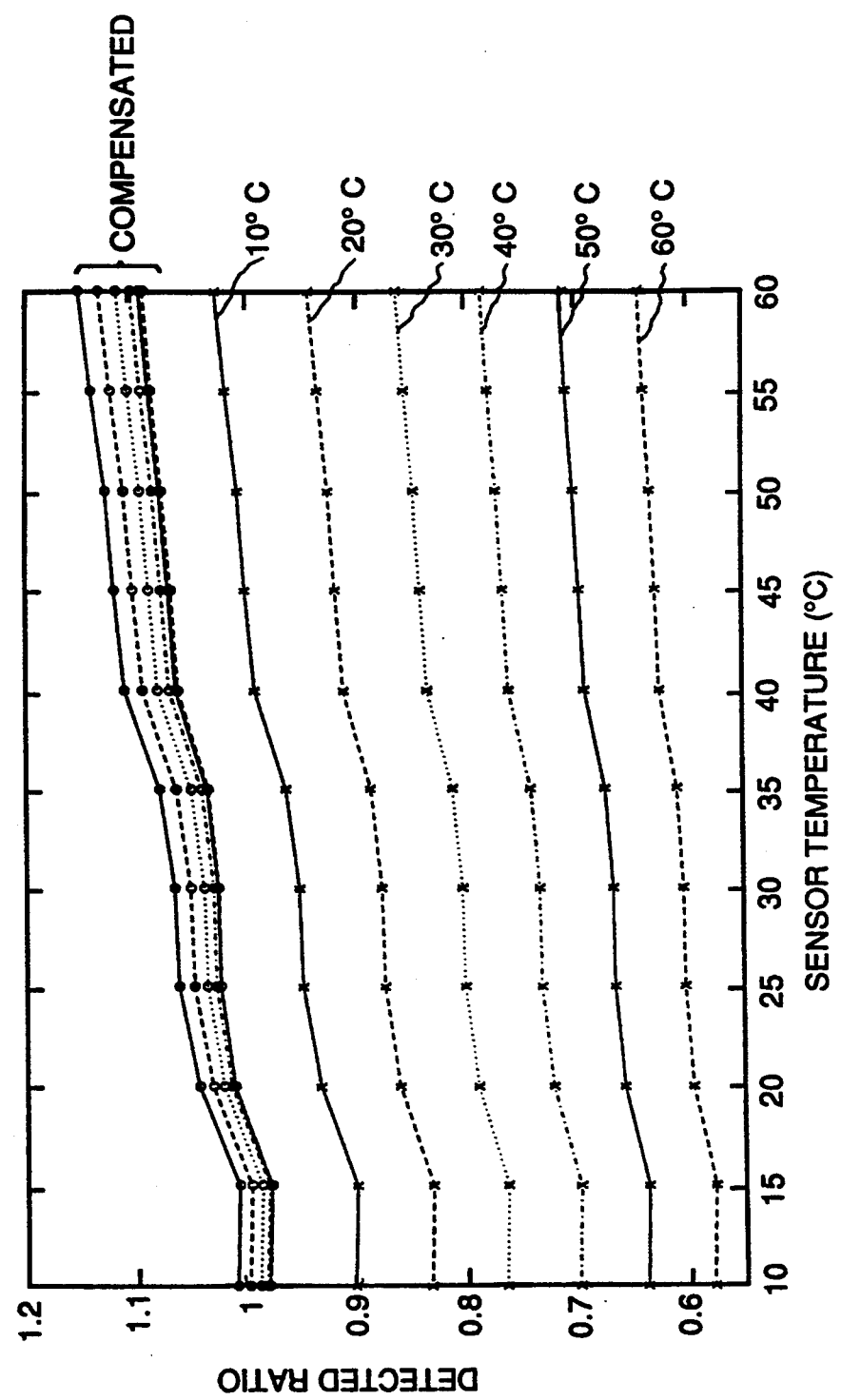
FIG. 9 is a graphical comparison of the detected ratio of another optically compensated optical detection system with an optically uncompensated system.

FIG. 9 illustrates the simulated detected ratio of the optically compensated detection system (o) in comparison with that of an uncompensated system (x), measured over a range of sensor temperatures, in which $\lambda^d_c(\theta)$ and $\lambda^s_c(\phi) = 845$ nm and the filter type is F1 (shown in the graph of FIG. 3).

Figure 10:
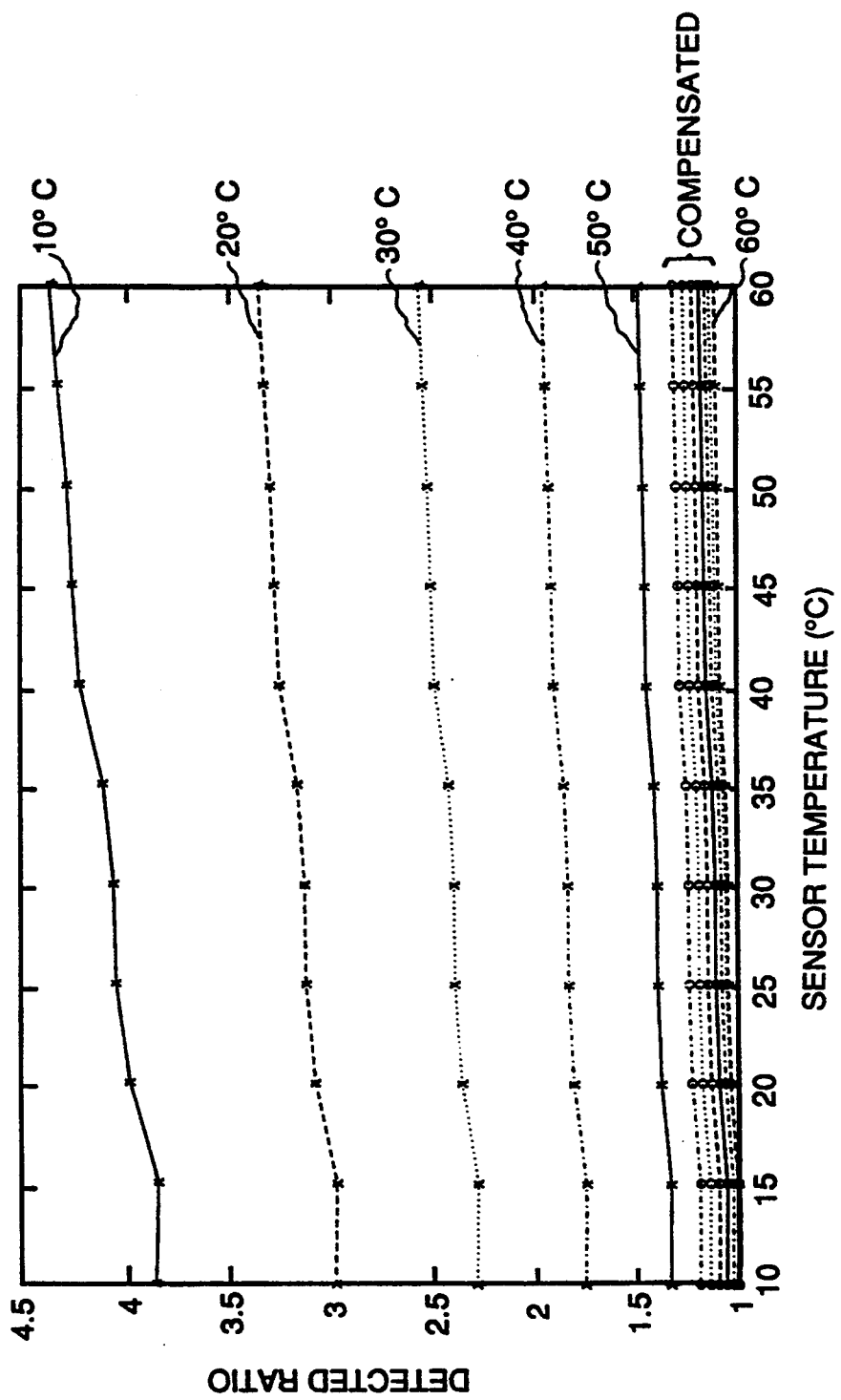
FIG. 10 is a graphical comparison of the detected ratio of still another optically compensated optical detection system with an optically uncompensated system.

FIG. 10 illustrates the simulated detected ratio of an optically compensated detection system (o) in comparison with that of an uncompensated system (x) in which $\lambda^d_c(\theta)$ and $\lambda^s_c(\phi) = 845$ nm, measured over a range of sensor temperatures and wherein and the filter type is F2 (shown in the graph of FIG. 3).

Figure 11:
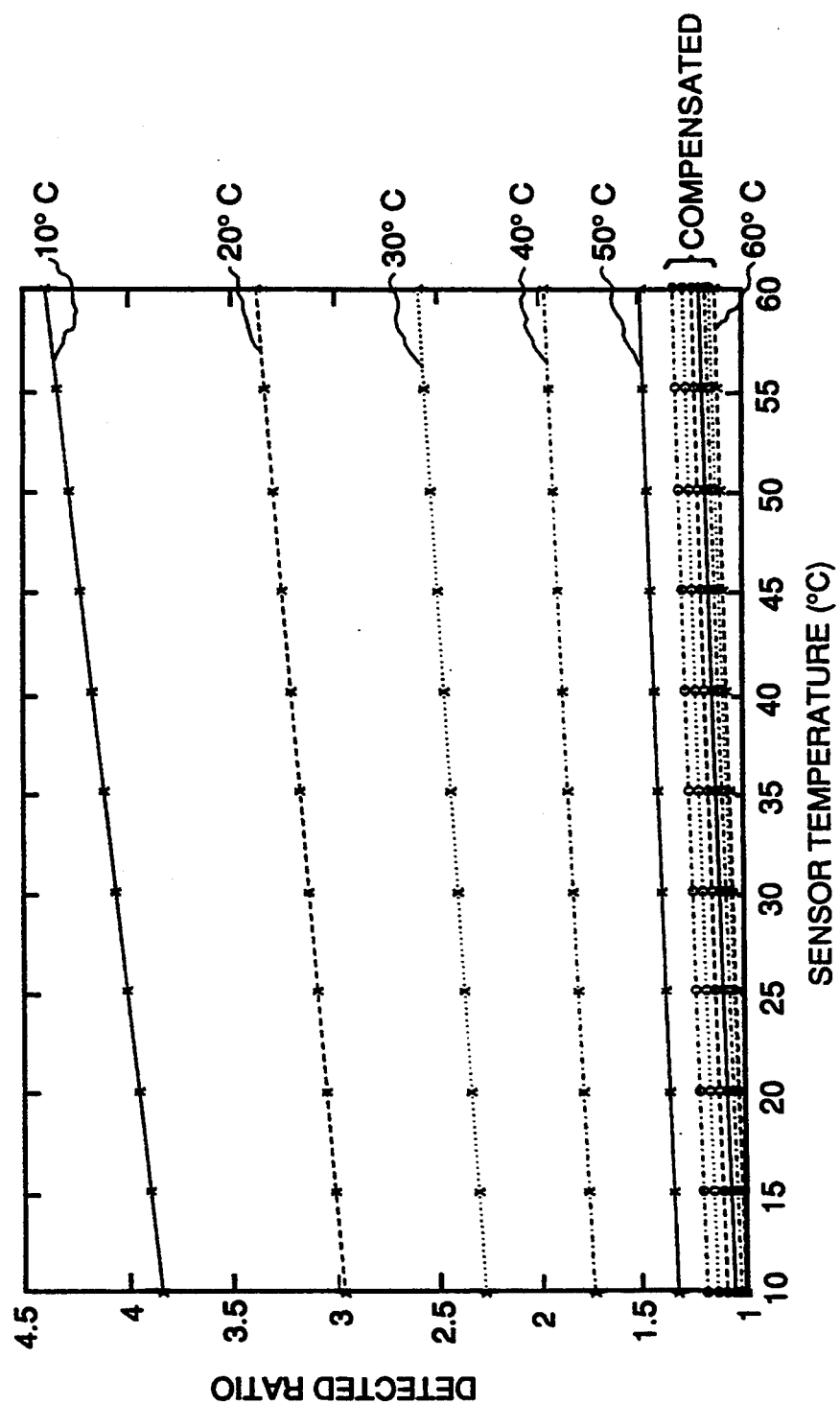
FIG. 11 is a graphical illustration of data of FIG. 10 with the respective calibration fits.

FIG. 11 illustrates the simulated data of FIG. 10 shown with the respective calibration fits. In this case the calibration fits are linearized curves formed mathematically and numerically by applying least square optimization formulas to the sets of data points.

Figure 12:
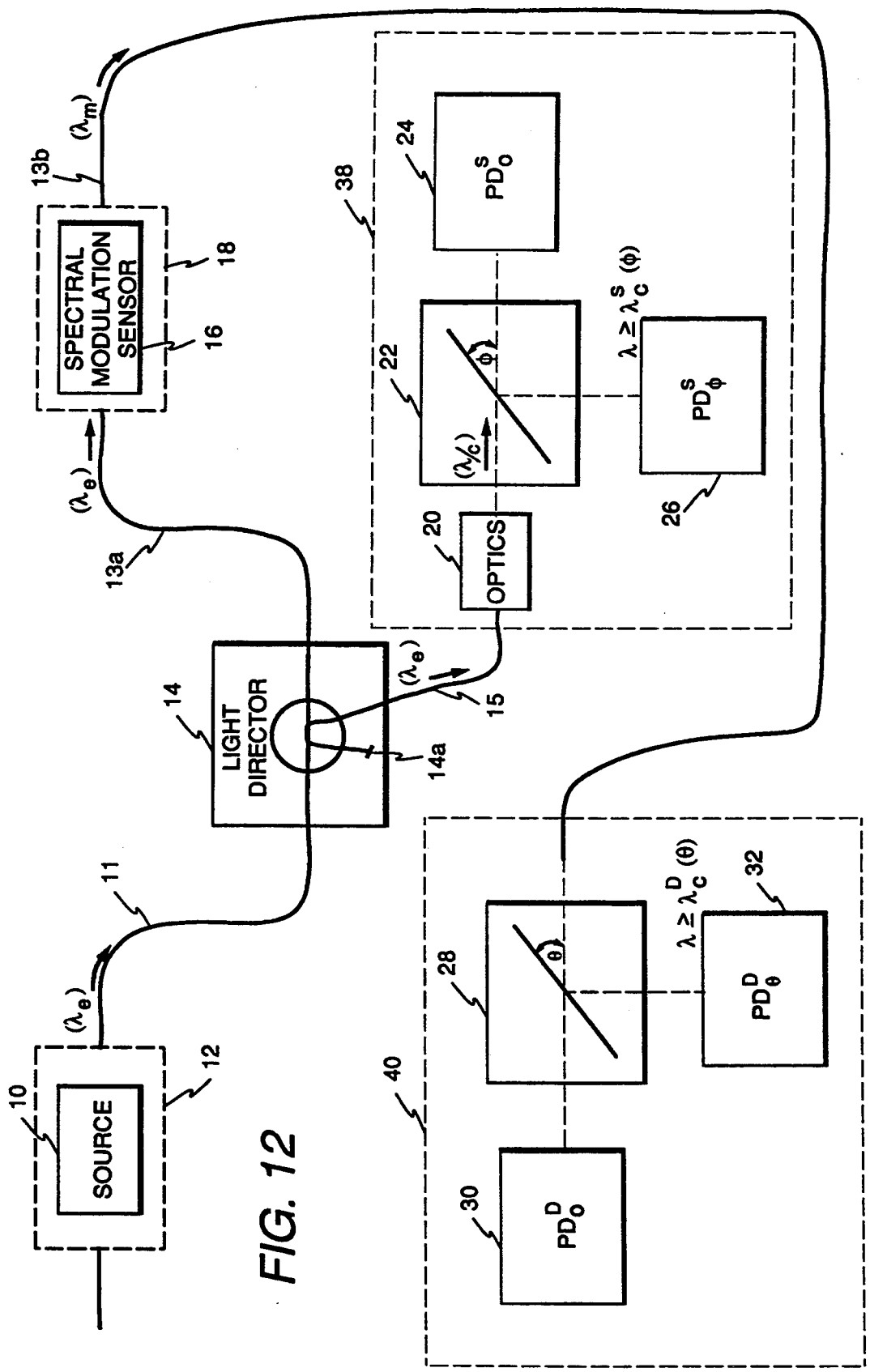
FIG. 12 is a schematic diagram of one embodiment of the invention employing a transmissive spectral modulation sensor.

FIG. 12 is a schematic diagram of an embodiment of the invention employing a transmissive spectral modulation sensor. Sensor 16 can be a transmissive SMS such as supplied by Metricor, Inc. This embodiment differs from that of FIG. 1 in that the modulated light travels through fiber 13b to detection monitoring component 40 rather than back through fiber 13a and light director 14, as shown in FIG. 1. If a directional coupler is used for light director 14, in the preferred embodiment, the end 14a is either crushed or coated with an index matching gel, for example, so that no light is reflected from end 14a.

Figure 13:
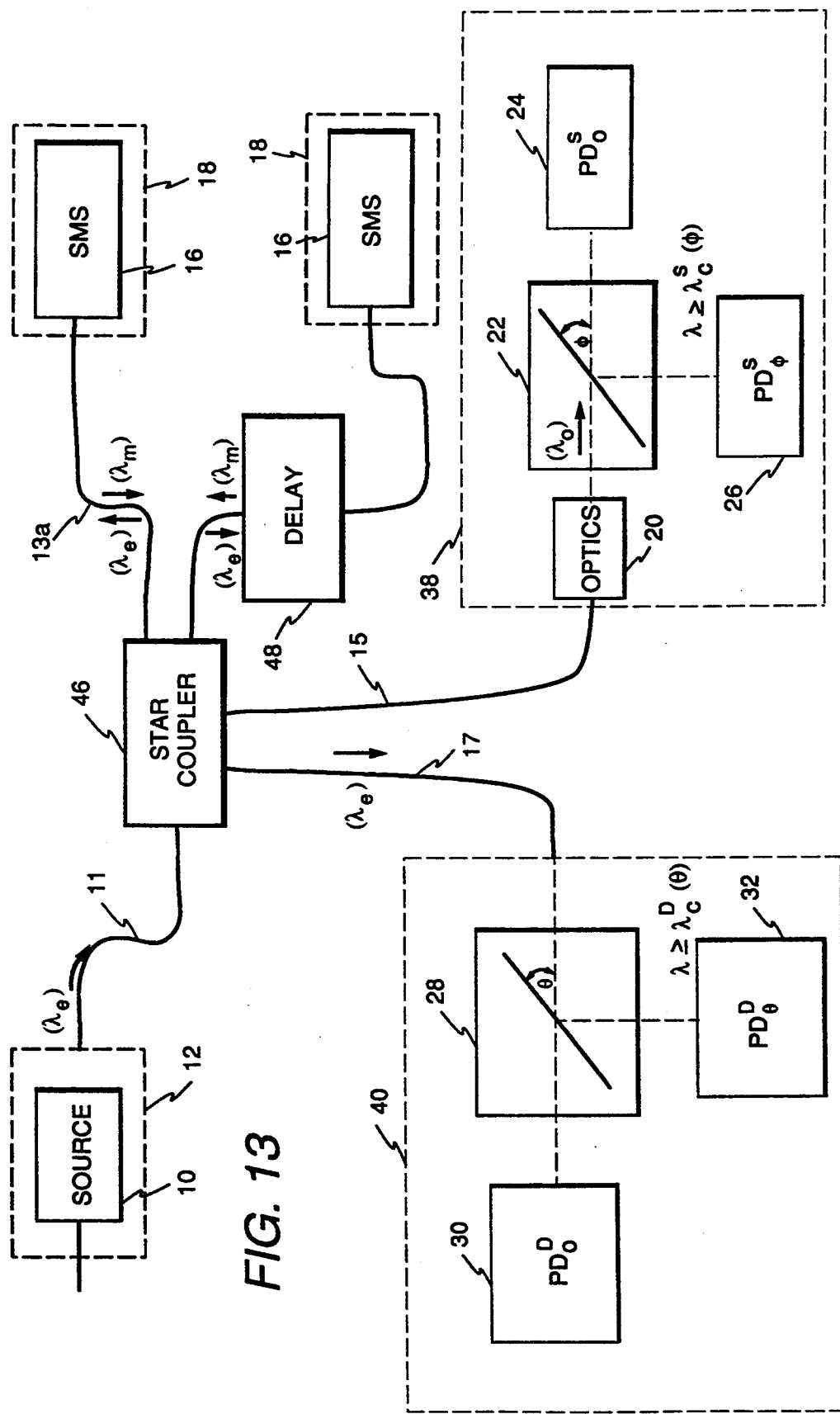
FIG. 13 is a schematic diagram of one embodiment of the invention employing multiplexed spectral modulation sensors.
Figure 14:
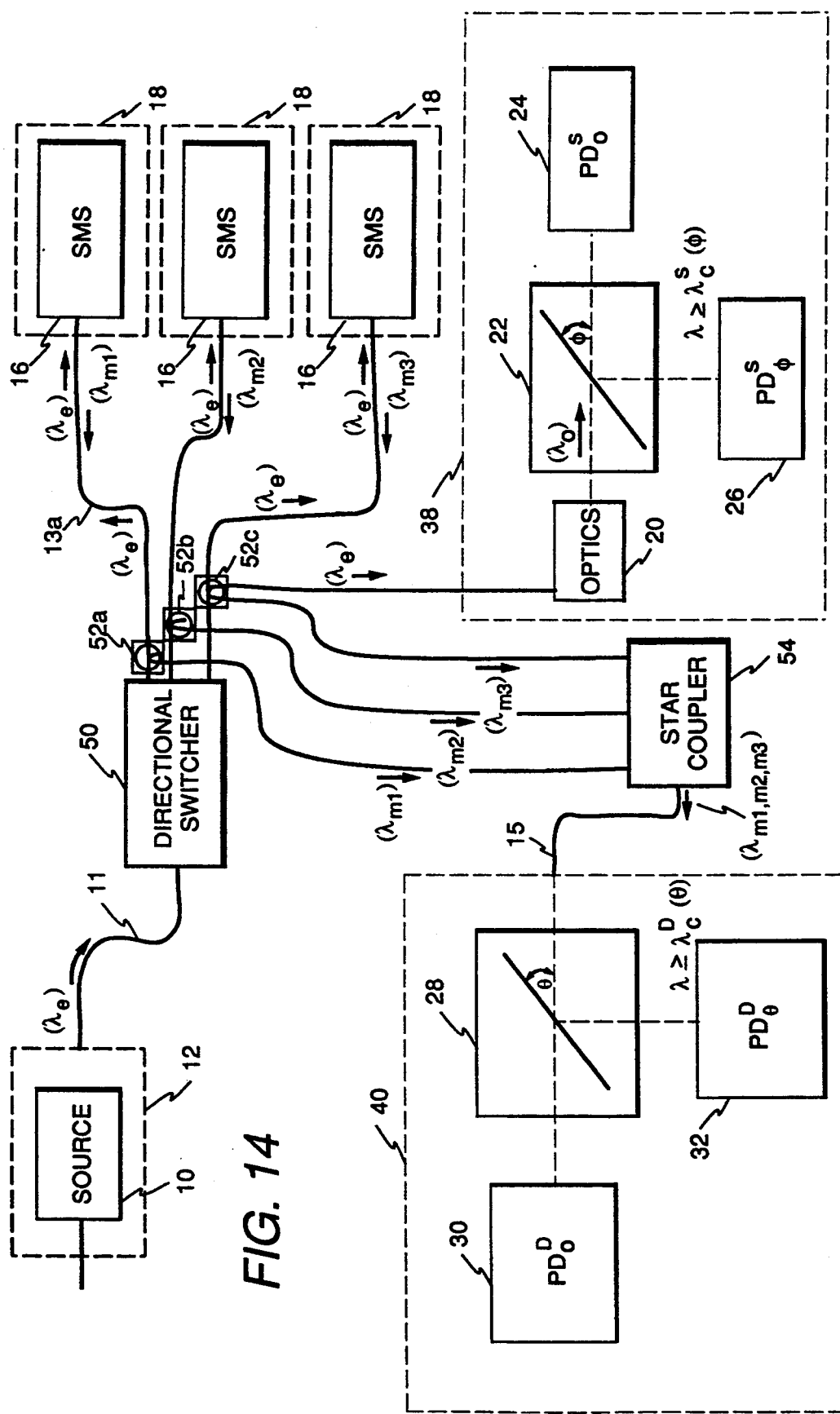
FIG. 14 is a schematic diagram of another embodiment of the invention employing multiplexed spectral modulation sensors.

FIGS. 13–15 are schematic diagrams of several sample embodiments for multiplexing sensors in the present invention. Although FIGS. 13–14 are illustrated using reflective spectral modulation sensors 16, they are equally applicable for use with transmissive sensors with minor modifications which will be described below. In each case, source 10, source monitoring component 38, and detection monitoring component 40 are similar to those discussed with respect to the embodiment of FIG. 1. The aspects which differ are the methods of coupling the sensors to the source and monitoring components.

In the embodiment of FIG. 13, time division multiplexing is used with reflective sensors. Fiber 11 carries excitation light from source 10 to a star coupler 46, such as supplied by Canstar of Westboro, Mass., which, in turn, distributes the light to source monitoring component 38 and a plurality of SMS 16. Although, for simplicity, two sensors are shown, any number of sensors can be used. A spectrally passive delay 48 is present between the star coupler and each sensor 16, except that a delay is not needed for the first sensor. Preferably, fast diodes are used to provide short delays. If transmissive sensors are used, the modulated light travels through separate fibers (not shown) to detection monitoring component 40, in a manner similar to the embodiment shown in FIG. 12, rather than back through fiber 13a and light director 14 as shown in FIG. 13.

In the embodiment of FIG. 14, unidirectionally switched architectures are obtained by the directional switching of light from source 10 carried by fiber 11 to various reflective sensors 16 on the network through a directional switcher 50, which can comprise a commercially available device such as a Brimrose Acousto-optical Modulator or an electro-opto-mechanical Canstar N×1 switch. A plurality of directional couplers, shown as directional couplers 52a, 52b, and 52c, are used, with each directional coupler coupling light from directional switcher 50 to each respective one of the plurality of sensors. In one embodiment, at least one of directional couplers 52a–52c is also coupled to source monitoring component 38. The light modulated by the sensors ($\lambda_{m1}, \lambda_{m2}, \lambda_{m3}$) is coupled through the directional couplers to a star coupler 54 which then combines the modulated light and sends the combined modulated light ($\lambda_{m1, m2, m3}$) to detection monitoring component 40.

Although the embodiment of FIG. 14 shows source monitoring component 38 attached to one of the directional couplers 52a–52c, the source monitoring component need not be attached in this manner. For example, source monitoring component 38 may instead be attached to the directional switcher. Moreover, although the embodiment of FIG. 14 shows the directional couplers coupling sensors 16 to star coupler 54, directional couplers 52a–52c need not be used in an embodiment where the sensors are transmissive sensors; instead, output signals from such transmissive sensors may be coupled directly to star coupler 54.

A bidirectional switched architecture, in which both source 10 as well as detection monitoring component 40 are switched respectively to and from sensors 16, is shown in the embodiment of FIG. 15. A directional coupler 56 is used to couple the source into directional switcher 50. This directional coupler is also used for coupling the response coming through the directional switcher to detection monitoring component 40 as well as for coupling to source monitoring component 38. Each of the output signals of the directional switcher is supplied to a respective sensor 16, without going through an individual directional coupler.

Although, the embodiment of FIG. 15 shows source monitoring component 38 coupled to directional coupler 56, the source monitoring component need not be utilized in this manner. For example, the source monitoring component may instead be coupled to the directional switcher.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical temperature compensation system for spectral modulation sensors, comprising:
   a light director for receiving excitation light;
   a spectral modulation sensor optically coupled to said light director for receiving a first portion of the excitation light from said light director;
   a source monitoring component for receiving a second portion of the excitation light from said light director, said source monitoring component comprising offset optics optically coupled to said light director, a source dichroic filter for splitting light emanating from said offset optics, a first source photodetector for receiving wavelengths above the effective cutoff wavelength of said source dichroic filter, and a second source photodetector for receiving wavelengths below the effective cutoff wavelength of said source dichroic filter; and
   a detection monitoring component for receiving modulated light from said spectral modulation sensor, said detection monitoring component comprising a detection dichroic filter for splitting light from said spectral modulation sensor, a first detection photodetector for receiving wavelengths above the effective cutoff wavelength of said detection dichroic filter, and a second detection photodetector for receiving wavelengths below the effective cutoff wavelength of said detection dichroic filter.

2. The system of claim 1, wherein said light director comprises a directional coupler.

3. The system of claim 2, further including a light source and wherein:
   said spectral modulation sensor comprises a reflective spectral modulation sensor; and
   said directional coupler optically couples said light source and said detection monitoring component to said spectral modulation sensor and said source monitoring component.

4. The system of claim 1, further including a light source and wherein said spectral modulation sensor comprises a transmissive spectral modulation sensor; and
   wherein said directional coupler optically couples said light source to said source monitoring component and said spectral modulation sensor, and said spectral modulation sensor is further directly coupled to said detection monitoring component.

5. The system of claim 1, wherein said offset optics comprises an optical filter selected from the group of multi-layer interference and Fabry-Perot filters.

6. An optical temperature compensation system for spectral modulation sensors, comprising:
   a plurality of spectral modulation sensors;
   a light director optically coupled to said plurality of spectral modulation sensors for receiving excitation light and for delivering respective sensor portions of the excitation light to said spectral modulation sensors;
   a source monitoring component for receiving a source portion of the excitation light from said light director, said source monitoring component comprising offset optics optically coupled to said light director, a source dichroic filter for splitting the light from said offset optics, a first photodetector for receiving wavelengths above the effective cutoff wavelength of said source dichroic filter, and a second source photodetector for receiving wavelengths below the effective cutoff wavelength of said source dichroic filter; and
   a detection monitoring component for receiving modulated light from said plurality of spectral modulation sensors, said detection monitoring component comprising a detection dichroic filter for splitting light from said plurality of spectral modulation sensors, a first detection photodetector for receiving wavelengths above the effective cutoff wavelength of said detection dichroic filter, and a second detection photodetector for receiving wavelengths below the effective cutoff wavelength of said detection dichroic filter.

7. The system of claim 6, wherein said light director comprises a star coupler, and further comprising at least one spectrally passive delay being optically coupled between said star coupler and a respective predetermined one of said plurality of sensors.

8. The system of claim 6, wherein said light director comprises an optical directional switcher, and further comprising a star coupler optically coupled to said spectral modulation sensors for receiving modulated light from said plurality of sensors.

9. The system of claim 8, wherein said plurality of spectral modulation sensors comprise reflective spectral modulation sensors and further comprising a plurality of directional couplers, each one of said directional couplers coupling said optical directional switcher and said star coupler with a respective one of said sensors.

10. The system of claim 6, wherein said light director comprises an optical directional switcher, and further comprising a directional coupler coupling said excitation light and said detection monitoring component with said optical directional switcher and said source monitoring component.

11. An optical temperature compensation system for spectral modulation sensors, comprising:
- means for splitting excitation light into two excitation portions;
- means for spectrally modulating one of said two excitation portions of said excitation light;
- means for splitting the modulated portion of said excitation light into a first modulated portion having wavelengths above a cutoff wavelength and a second modulated portion having wavelengths below said cutoff wavelength;
- means for optically detecting said first and second modulated portions;
- means for optically offsetting the other of said two excitation portions of said excitation light;
- means for splitting the offset portion of said excitation light into a first offset portion having wavelengths above a cutoff wavelength and a second offset portion having wavelengths below said cutoff wavelength;
- means for optically detecting said first and second offset portions; and
- means for determining a first ratio of the detected modulated portions of modulated light and a second ratio of the detected offset portions of offset light and multiplying the first and second ratios.

12. The system of claim 11, wherein said splitting means comprises a directional coupler.

13. The system of claim 12, further including a light source and wherein:
- said modulating means comprises a reflective spectral modulation sensor; and
- said directional coupler optically couples said light source and said means for optically detecting said first and second modulated portions to said modulating means and said means for optically detecting said first and second offset portions.

14. The system of claim 12, further including a light source and wherein:
- said modulating means comprises a transmissive spectral modulation sensor; and
- wherein said directional coupler optically couples said light source to said offsetting means and said spectrally modulating means, and said spectrally modulating means is further directly coupled to said means for splitting said modulated portion of said excitation light.

15. The system of claim 11, wherein said offsetting means comprises an optical filter selected from the group of multi-layer interference and Fabry-Perot filters.

16. A method of achieving temperature compensation for spectral modulation sensors, comprising the steps of:
- providing excitation light;
- splitting the excitation light into two excitation portions;
- spectrally modulating one of said two excitation portions of said excitation light;
- splitting said modulated portion of said excitation light into a first modulated portion having wavelengths above a cutoff wavelength and a second modulated portion having wavelengths below said cutoff wavelength;
- optically detecting the first and second modulated portions;
- optically offsetting the second excitation portion of said excitation light;
- splitting the offset portion of said excitation light into a first offset portion having wavelengths above a cutoff wavelength and a second offset portion having wavelengths below said cutoff wavelength;
- optically detecting the first and second offset portions; and
- determining the ratios of the detected modulated portions of modulated light and of the detected offset portions of offset light.

* * * * *